Patented Apr. 22, 1947

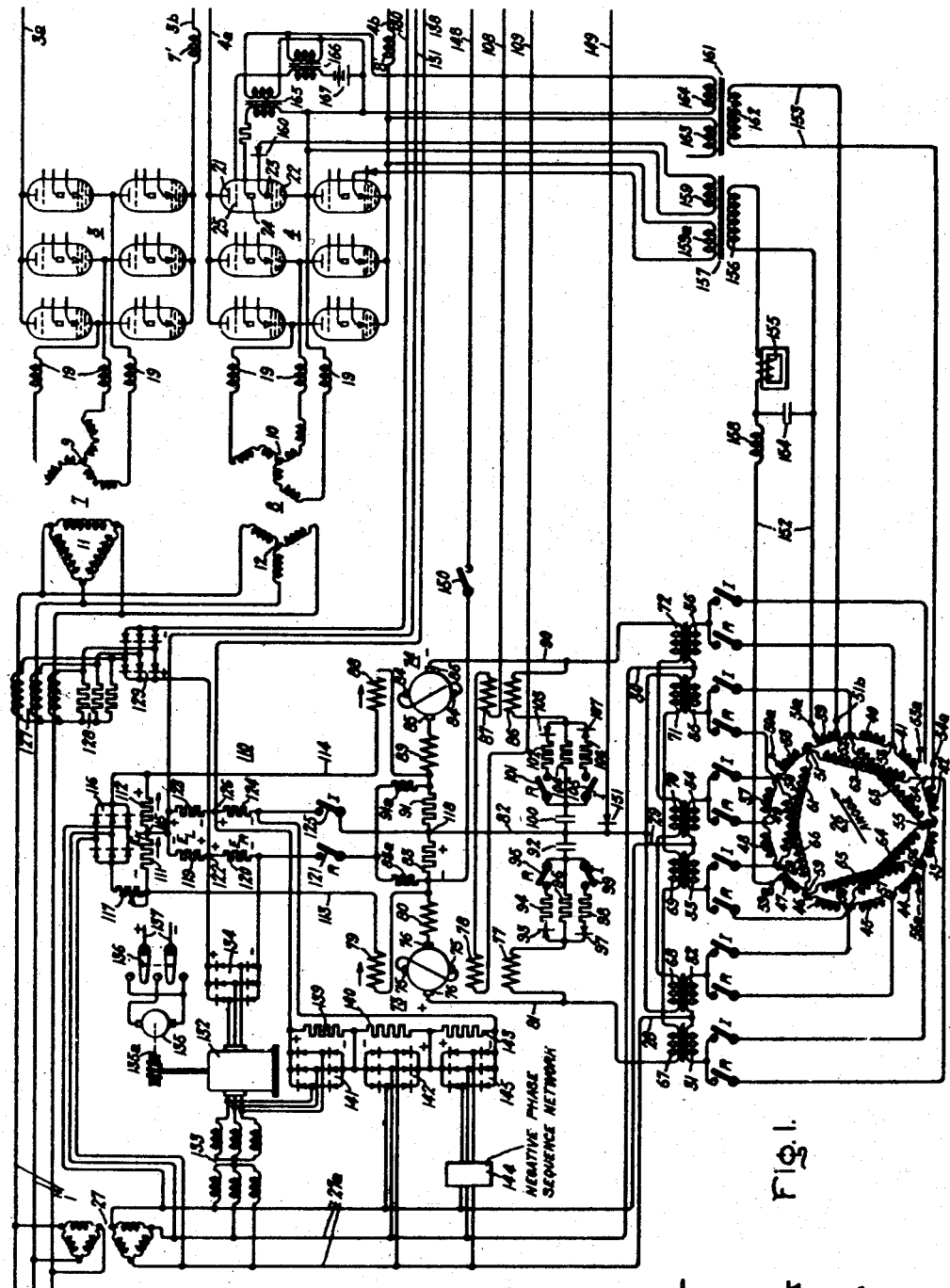

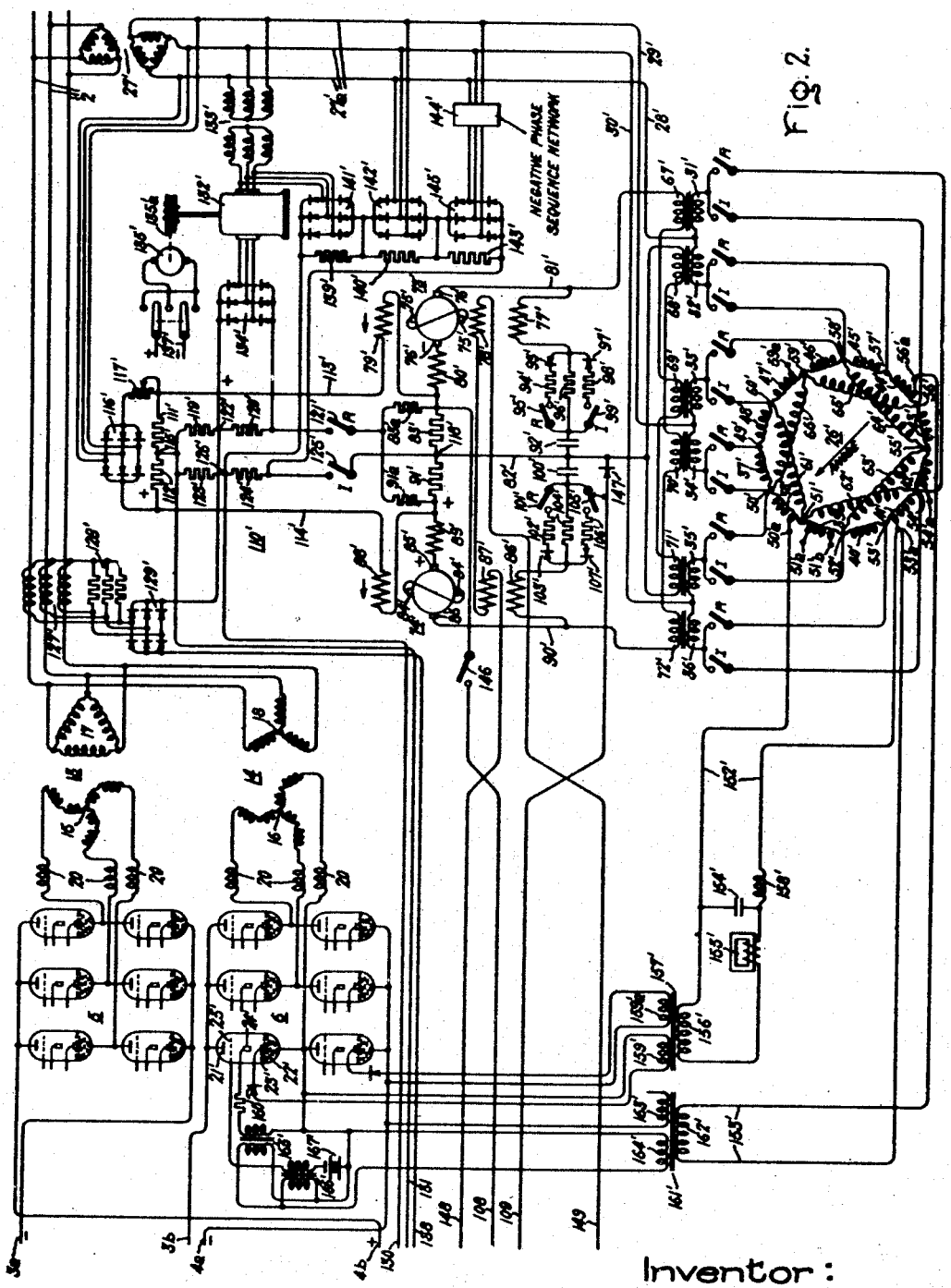

2,419,466

UNITED STATES PATENT OFFICE 2,419,466

ELECTRONIC CONVERTER

Clodius H. Willis, Princeton, N. J., assignor to General Electric Company, a corporation of New York Application June 12, 1944, Serial No. 539,842

31 Claims. (Cl. 171—97)

1

My invention relates to electronic converters and more particularly to the excitation and control circuits for electronic power conversion apparatus utilized to interconnect two alternating current circuits which may be of the same or of different frequencies.

Many types of electronic converters have been proposed in the past and several types have been placed in commercial use. One of the better known types is that involving dual conversion wherein alternating current is rectified by an electronic converter to direct current and then a second conversion is effected by a second electronic converter from direct current back to alternating current. Such electronic converters may be utilized as tie-line apparatus, as frequency changers, or as a direct current transmission system.

The operating requirements usually demanded of a frequency converter or tie-line apparatus are that the direction of power flow be reversible at will, that the load be independent of system frequency and small variations in system voltage, and that the load be adjustable to any desired value for either direction of power flow. Since electronic frequency converter apparatus of the dual conversion type involves both rectification and inversion, accurate firing of each tube of the inverter is essential and in a reversible power flow type, as here described, either group of tubes at the respective ends of the system may have to operate as an inverter. Hence, such a system requires a flexible, accurate and quickly responsive phase shift circuit without undue complications and also a control electrode or grid excitation circuit which can effect the various phase changes required for rectifier or inverter operation.

It is, therefore, an object of my invention to provide new and improved control apparatus for electronic power conversion apparatus.

It is another object of my invention to provide new and improved excitation and control circuits for electronic power conversion apparatus to meet one or more of the several requirements enumerated above, depending upon the function to be performed by the conversion apparatus.

It is another object of my invention to provide new and improved excitation and control apparatus for an electronic frequency converter to meet the several requirements enumerated above.

It is a further object of my invention to provide a new and improved control and phase shifting circuit of general application or of particular application with electronic conversion apparatus.

2

In accordance with the illustrated embodiment of my invention, I provide electronic frequency conversion apparatus of the dual conversion type for interconnecting two alternating current circuits of different frequency. The power circuit includes transforming apparatus and a pair of rectifier tube groups associated with one alternating current circuit and transforming apparatus and a pair of inverter tube groups associated with the other alternating current circuit with a direct current link interconnecting the various tube groups. The particular tubes shown are of the igniter type provided with grids so that grid control is utilized on the rectifiers to establish the desired load and inverter grid control is utilized to maintain the phase of the inverter grids at the proper angle required for deionization. Grid and igniter power are supplied from a phase shift network operated by direct current saturated reactors. The phase angle is controlled by a controlled direct current dynamo-electric machine which furnishes saturating current to the reactors. Recovery from rectifier and inverter faults is obtained by electronic means without opening any power circuits and with only momentary loss of power.

My invention will be better understood from the following description taken in connection with the accompanying drawings, and its scope will be pointed out in the appended claims.

In the drawings, Figs. 1 and 2, taken together, are a diagrammatic representation of one embodiment of my invention in a complete dual conversion electronic system, whereas Fig. 1 or Fig. 2, considered separately, is a diagrammatic representation of an embodiment of my invention in a single step electronic conversion system.

Referring to the drawings, and for the present to Figs. 1 and 2 considered together, I have shown an alternating current circuit 1 which is to be interconnected with an alternating current circuit 2. I will consider first the power circuits and to facilitate the description will refer, by way of example, to circuit 1 as a 60 cycle power circuit and the tube groups associated therewith as rectifiers, and the circuit 2 as a 25 cycle power circuit and the tube groups associated therewith as inverters. It is to be understood, however, that the power circuits may be of any desired power frequency of the same or of different frequencies, and that the tube groups associated with either power circuit may be operated as rectifiers or inverters. Under the assumed conditions of function, I have illustrated in Fig. 1 two tube groups 3 and 4 of six tubes each, arranged for three phase full wave rectification, and with tubes which are 180 degrees apart in phase position mounted back to back with the cathode of one tube connected to the anode of another. In Fig. 2, I have illustrated two tube groups 5 and 6 of six tubes each, similarly arranged for three phase full wave inversion. The tube groups 3, 4, 5 and 6 are connected alternately in series in a direct current loop which includes a double winding, direct current reactor 7 with each winding thereof connected in series between a rectifier and an inverter. The alternate arrangement of the 25 and 60 cycle tube groups in the direct current loop minimizes the voltage level and is a feature described and claimed in an application of A. Schmidt, Serial No. 539,939 filed concurrently herewith and assigned to the assignee of the present application.

The rectifier tube groups 3 and 4 are connected to the alternating current circuit 1 through transformers 7 and 8 which are designed and connected to obtain multiphase operation. One arrangement which has been found to be satisfactory in service is to utilize two three-phase secondary windings 9 and 10, displaced from each other thirty degrees, which may be obtained by connecting a primary winding 11 associated with secondary winding 9 in delta connection and a primary winding 12 in Y-connection associated with secondary winding 10. The inverter type groups 5 and 6 are similarly connected to the alternating current circuit 2 through transformers 13 and 14 having, respectively, Y-connected secondary windings 15 and 16 and delta and Y-connected primary windings 17 and 18. Between each group of transformer secondary windings and its associated tube group current limiting reactors 19 and 20, respectively, are introduced to limit the fault currents during arc-backs or a short circuit on the direct current bus.

The three-phase double-way (full wave) circuit illustrated is particularly desirable because of its high apparatus economy and good operating characteristics. Although my invention is not limited to the use of any particular type of tube, I have found in practice that of the presently available commercial forms a type known in the art as a pentode ignitron is satisfactory for large power commercial use. For the details of this type of tube, reference may be had to U. S. Letters Patent No. 2,209,819, granted July 30, 1940, upon an application of K. H. Kingdon and assigned to the assignee of the present invention. For the purpose of explaining my invention, it will suffice to refer to one of the pair of tubes of tube group 4 which is to be taken as representative of all of the other tubes. Each tube comprises an anode 21, a mercury pool type cathode 22, an immersion-igniter member 23, a holding anode 24 and a control member or grid 25. The immersion-igniter 23 establishes a cathode spot by conducting a current peak of short duration whereupon an arc is established and maintained by the holding anode 24. The grid 25 is utilized to determine the time of starting conduction between anode and cathode and also reduces the deionization period at the end of conduction.

Before considering the excitation and control means for the several electrodes of the tubes, it may be helpful to consider briefly some of the characteristics of the rectifier and inverter action of tubes. The direct current voltage of the rectifier tube group or an inverter tube group may be varied by grid control. If $a$ represents the angle by which the grids of the rectifier are retarded, the theoretical direct current voltage $E'_{do}$ of the rectifier will be $$E'_{do} = E_o \cos a \quad (1)$$

In inverter operation the grids may be advanced by the angle B and the corresponding theoretical counter E. M. F. $E''_{do}$ will be $$E''_{do} = E_o \cos B \quad (2)$$

The current-limiting reactors 19 and 20 together with the leakage reactance of the transformers causes a reduction of the direct current voltage when operating as a rectifier and an increase in the direct current countervoltage when operating as an inverter. The direct current voltage change $E_x$, which is a drop for a rectifier or a rise for an inverter, is given for the three phase full-wave circuit by the relation $$E_x = \tfrac{1}{2} X_u I_u E_o \quad (3)$$

where $E_o$ represents the no load direct current voltage, $X_u$ represents the per unit reactance, and $I_u$ represents the per unit load current. Connecting the theoretical D.-C. voltage for tube arc drop $E_a$, reactance drop $E_x$, and for transformer copper losses, the output D.-C. voltage of the rectifier $E'_{dc}$ will be $$E'_{dc} = E_o \cos a - 2E_a - I_u(R_u + X_u)E_o \quad (4)$$

Here, $R_u$ represents the per unit transformer resistance. A similar relation for the inverter voltage $E''_{dc}$ is obtained by adding the arc voltage and the resistance and reactance voltages to the theoretical direct current voltage $E''_{do}$.

$$E''_{dc} = E_o \cos B + 2E_a + I_u(R_u + \tfrac{1}{2} X_u)E_o \quad (5)$$

The 25 and 60-cycle transformers will be assumed to have substantially equal copper losses and the current limiting reactances should have values of the same order of magnitude for reversible operation. The load current and D.-C. voltage must be the same for the rectifier and inverter. These simplifying conditions give $$I_u = \frac{\cos a - \cos B - 4\frac{E_a}{E_o}}{X_u + 2R_u} \quad (6)$$

The arc drop in high voltage tubes $$4\frac{E_a}{E_o}$$

will be of the order of 1% of the load.

Equation 6 shows that the angle of inverter advance B must be greater than the angle of rectifier retard $a$. Increasing B or decreasing $a$ will raise the load. In practice, it is desirable to control $a$ to regulate the load flow to the desired value. In the case of a low voltage on the rectifier side or high voltage on the inverter side, it may be impossible to obtain the desired load by reducing $a$ to zero. It will then be necessary to transfer the function of load control to the inverter and increase B to obtain the desired load. For normal voltage levels and loads, it is preferable to control the load by the rectifier grids for both directions of power flow. The inverter grids being adjusted to provide ample deionization time. It is known that the grid of a gas tube is not able to gain control (prevent current conduction) until a short interval has elapsed after conduction. This interval required for regaining control is known as the deionization time.

The deionization time is of primary consideration in inverter commutation. During the deionization time, the anode of the tube must be held negative to prevent conduction. The duration of the negative anode voltage may exceed the deionization time required by the tube, but the deionization time sets a minimum duration for the negative anode voltage. Commutation in an inverter requires that the next succeeding tube to take over must be fired before its line to neutral voltage equals that of the tube from which current is being commutated. The angle by which the next conducting tube is fired ahead of the tube from which current transfers is called the angle of grid advance $\theta$. The transfer is effected because the counter E. M. F. in the phase of the tube taking over is lower than the tube presently conducted. The voltage difference between these two tubes is the commutating voltage. The action is quite similar to commutation in a D.-C. motor when the brushes are shifted against the direction of rotation. If the commutating voltage persists after the current has been transferred to the tube next in order, the remaining commutating voltage will be in a direction to reverse the current through the previously conducting tube and will appear as a negative voltage across this last mentioned tube. During this interval, the previously conducting tube must deionize because after this period a positive voltage will be impressed between the anode and cathode of the previously conducting tube. A loss of control will result if the previously conducting tube has not regained control.

It is evident that the angle of grid advance which was represented by B in Equation 2 equals the commutating angle plus the available deionization time. Writing this in the form of an equation where U represents the commutating angle and M represents the available deionization angle or margin angle $$B = U + M \qquad (7)$$

The angle M has been called the "margin angle" because it is usually larger than the minimum required for deionization and provides a safety factor in commutation. If the A.-C. voltage drops or the load increases without a corresponding increase in the angle B, the margin angle will be partly absorbed by the greater commutating angle. A large margin angle results in low power factor operation so it is desirable to operate with as small a margin angle as possible. From Equation 7 it is evident that the angle of advance B must be increased with load to maintain a constant margin angle because the angle of commutation U will increase with load. Increasing angle B will, however, cause a greater load as shown by Equation 6. As a result, it has been found that increasing the inverter load angle, while holding the rectifier grids fixed, results in a larger load with an approximately constant margin angle.

In the light of the previous discussion, the phase shift circuit, may now be considered with a better appreciation of the various functions involved. Generally speaking, the rectifier grids should be controlled to maintain the desired load and the inverter grids varied with load to maintain a safe margin angle. When changing the respective tube groups from rectifier to inverter operation for reverse power flow, the phase position of the grid voltage of the respective tube groups must be shifted by approximately 150 degrees. These functions for that part of the system shown in Fig. 1 are performed, in accordance with my invention, by the phase-shift network 26 and its associated circuits.

Power for both the grid and ignition circuits of the assumed 60 cycle end is obtained from an auxiliary power transformer 27 which is utilized to energize an auxiliary power bus 27a. The transformer 27 may be connected to the power circuit 1 as illustrated, or to a supply source correlated in frequency and in phase with the power circuit 1. Thus, three phase power is delivered by the bus 27a to lines 28, 29 and 30, which in turn are connected through variable impedance devices such as saturable reactors 31, 32; 33, 34 and 35, 36 to switching means R and I which may take the form of two six pole contactors wherein R signifies the rectifier contactor and I signifies the inverter contactor. These contactors introduce the grid phase shift necessary for reversing power flow which will be explained in detail later. Suitable interlocks (not shown) will, of course, be utilized to prevent simultaneous closing of the R and I contactors. These contactors connect the three-phase A.-C. lines 28, 29 and 30 to the twelve phase network 26. This network comprises a plurality of inductive windings arranged diagrammatically in the form of a polygon and for the illustrated embodiment of my invention comprises a twelve-sided polygon or ring winding consisting of windings identified in a clockwise order from the twelve o'clock position as windings 37 to 48, inclusive. The junction points of the windings starting with the twelve o'clock position are identified in a clockwise direction by the points 49 to 60, inclusive. Stabilizing windings 61 to 66 interconnect, respectively, the junction points 60 and 51, 51 to 54, 52 to 55, 55 to 58, 56 to 59 and 59 to 50. Each of the several groups of windings in parallel physical relation considered diagrammatically, such as the triplet of windings such as 48, 66 and 42, would be placed on the same magnetic core (not shown). Each of the peripheral windings 37 to 48, inclusive, may be provided with taps for connection of the respective excitation circuits, but to avoid undue complexity in the drawings only those taps required for the excitation circuits illustrated will be referred to later. The impedances 31 to 36 are illustrated as direct current saturated reactors. In accordance with my invention, I provide a direct current energized control winding for each reactor identified as 67 to 72. The odd numbered control windings 67, 69 and 71 are associated, respectively, with the odd numbered reactors 31, 33 and 35 and are connected in series relation to be variably energized from a controllable source of direct current such as a controlled dynamo-electric machine to be described later. The even numbered control windings 68, 70 and 72 are associated, respectively, with the even numbered reactors 32, 34 and 36 and are connected in series relation to be variably energized from a second controllable source of direct current such as a controlled dynamo-electric machine to be described later.

If it be assumed that the R contactor is closed (all R switches closed) each of the A.-C. lines 28, 29 and 30 will be connected to two points on the 12-phase network 26. Thus line 29 is connected through reactor 33 to junction point 58 in the network and is also connected through reactor 34 to junction point 49. Junction points 58 and 49 are separated by 90 degrees on this network. In a similar manner, line 28 is connected to points 54 and 57 through reactors 31 and 32, and line 30 is connected to points 50 and 53 through reactors 35 and 36. If the odd numbered reactors 31, 33 and 35 are fully saturated and the even numbered reactors 32, 34 and 36 are unsaturated, lines 28, 29 and 30 are closely connected to points 54, 58 and 50. Now if the odd numbered reactors are desaturated and the even numbered reactors are fully saturated, this effects approximately a 90 degree shift in the lines 28, 29 and 30 to points 57, 49 and 53. It is, therefore, evident that the 12-phase network 26 with the R contactor closed can effect approximately a 90 degree phase shift by selectively desaturating one reactor and saturating its associated reactor. When the I contactor is closed (all I switches closed) and the R contactor opened, the saturating reactor of each input phase conductor 28, 29 and 30 spans an angle of only about 60 degrees and the grids may be advanced continuously through an angle of the order of 60 degrees beginning at about an initial advance of the order of 20 degrees for inverter operation. This shift in phase angle for either rectifier or inverter is fairly continuous with variations in the control saturating current. The voltage variations of the network 26 need not exceed 10% over a phase shift of substantially 90 degrees, and it has been found that the time required for a complete phase shift of substantially 90 degrees need not exceed 0.1 second for a 60 cycle network. All tube control power for the grids, igniters and holding anodes for the 60 cycle tube groups 3 and 4 is furnished by the single network 26. One important feature of this network is that the output circuits may be connected to the network in any given phase relation with respect to each other and this phase relation with respect to each other will not be disturbed when the effective points of entry to the network are shifted by the saturation control which, in effect, simultaneously shifts the phase of all the output circuits together with respect to a voltage of the network. A shift in phase of the effective points of entry in a clockwise direction around the network results, in effect, in rotating the network in a counterclockwise direction and is considered, according to convention, to represent an advance in phase, while a shift of points of entry in a counterclockwise direction in effect rotates the network in a clockwise direction and represents a retard in phase.

As previously noted, the variable direct current energization for the control saturating winding of the phase shift network 26 is obtained from controllable sources of direct current which are illustrated as a direct current dynamo-electric machine 73 for controlling the odd numbered saturating windings 31, 33 and 35 and a direct current dynamo-electric machine 74 for controlling the even numbered saturating windings 32, 34 and 36. Although various known types of dynamo-electric machines may be utilized to carry out my invention in its general aspects, I have found in practice that a particularly suitable type is the compensated cross-armature reaction excited machine known in the art as an amplidyne generator such as is described and claimed in U. S. Letters Patent No. 2,227,992, granted January 7, 1941, upon an application to E. F. W. Alexanderson and M. A. Edwards, and assigned to the assignee of the present application. The machine 73 is, therefore, illustrated with a pair of short circuit brushes 75 for providing the main armature reaction excitation of the machine and a pair of load brushes 76 which are displaced from the short circuit brushes 75. The machine 73 is also provided with three control fields which may be identified, in accordance with their respective functions, as an anti-hunt field winding 77, a transfer control field 78 and a control field 79. A compensating field 80 is also connected in series with the load circuit brushes in a conventional manner. The load circuit brushes 76 of the odd numbered amplidyne 73 are connected to energize the odd numbered saturation control windings 67, 69 and 71 through conductors 81 and 82. A resistor 83 is connected in series with the load brushes 76 and the saturation control windings 67, 69 and 71 to provide a component of voltage proportional to the armature current of machine 73.

The machine 74 is similarly illustrated with a pair of short circuit brushes 84, a pair of displaced load brushes 85, an anti-hunt field winding 86, a transfer control field 87, a control field 88 and a conventional compensating winding 89. The load circuit brushes 85 of the even numbered amplidyne 74 are connected to energize the even numbered saturation control windings 68, 70 and 72 through a conductor 90 and the previously recited conductor 82 which is a common conductor between the two machines. A resistor 91 is connected in series with the load brushes 85 and the even numbered saturation control windings to provide a component of voltage proportional to the armature current of machine 74.

The anti-hunt circuit of field winding 77 will now be considered. This anti-hunt field winding is connected across the output conductors 81 and 82 through a capacitor 92 connected in series relation with a three-path parallel network comprising in one path in series relation a rectifier 93, a resistor 94 and an R switch 95, a second path comprising a resistor 96, and a third path comprising in series relation a rectifier 97, a resistor 98 and an I switch 99. The rectifier 97 in the third path is poled oppositely to the rectifier 93 in the first path and these rectifiers are arranged to conduct current in the direction of the arrow. This anti-hunt circuit is arranged to be selective so that the response of the amplidyne will be more rapid in one direction than in the other. The R and I switches here, as well as in all other cases in the drawing, are interlocked so that when the R switches are closed the I switches are open and vice versa. The anti-hunt circuit may be better understood by considering the R switch 95 closed and the I switch 97 open. In this case the circuit will be from the conductor 81, through the anti-hunt field 77 and the two paths in parallel comprising rectifier 93, resistor 94 and R switch 95 and the path through resistor 96. These two paths join at the capacitor which is connected to conductor 82 and the other load circuit brush 76 of the amplidyne generator. The circuit will operate satisfactorily without the capacitor 92, although the capacitor makes the circuit more sensitive in response. The anti-hunt circuit with the R switch closed is so arranged that for rectifier operation and when retarding the grid plase angle, the current will be in a direction to have two paths, one through rectifier 93 and resistor 94 and the other through resistor 96. This relatively low resistance permits the anti-hunt effect to operate rapidly. When the current is in the reverse direction to advance the grid phase angle, there is only one path available which is through resistor 96 alone. This circuit then permits the anti-hunt effect to operate relatively slowly when advancing the grid phase angle. The reverse action is obtained when the I switch is closed for inverter operation. A similar anti-hunt circuit is provided for the anti-hunt field winding 86 of amplidyne generator 74. This circuit comprises a capacitor 100 connected in series with a three-path parallel branch circuit in which one path includes in series relation an R switch 101, a resistor 102 and a rectifier 103, a second path comprising a resistor 104 and a third path including in series relation an I switch 105, a resistor 106 and a rectifier 107. The rectifiers 103 and 107 are oppositely poled as indicated by the arrows. This circuit operates to effect an anti-hunt action in amplidyne generator 74 in the same manner as has been outlined for the co-operating amplidyne generator 73.

The transfer control fields 78 and 87 of the amplidyne generators 73 and 74 are connected with opposite polarity in a series circuit and connected for energization through conductors 108 and 109 to the amplidyne generators of the assumed inverter tube groups 5 and 6 of Fig. 2 to be described later.

The control field windings 79 and 88 of the amplidyne generators 73 and 74 are connected in a buck and boost arrangement to a control network 110 so that if the control signal increases the current of one amplidyne generator it will at the same time decrease the current of the other. One arm of the network 110 comprises a pair of resistors 111 and 112 connected in a series conduit with field windings 79 and 88 and amplidyne armature current resistors 83 and 91 through conductors 113 and 114. These network resistors 111 and 112 are provided with a common junction 115 and are arranged to be energized to establish a constant reference voltage. The variable energization, as illustrated, is from the bus 27a through a suitable rectifier 116 and an adjustable resistor 117 to adjust the value of the reference voltage. The network also comprises a two-path branch connected between the junction point 115 and the amplidyne armature current resistors 83 and 91. The path to the left, as viewed in the drawing, comprises in series relation a resistor 119, a resistor 120 and an R switch 121 and a double branch circuit comprising one resistor 83a connected to the left-hand terminal of resistor 83, and a second resistor 91a connected to the right-hand terminal of resistor 91. A junction tap 122 is provided between resistors 119 and 120. The path to the right comprises in series relation a resistor 123, a resistor 124 and an I switch 125 which is connected to a junction terminal 118 of resistors 83 and 91. A junction tap 126 is provided between resistors 123 and 124.

With both the R switch 121 and the I switch 125 in the open position, the control field 79 of the amplidyne 73 and the control field 88 of the amplidyne 74 are in series with the fixed voltage which may be referred to as $E_K$ existing across the resistors 111 and 112 of the network and a voltage drop across the resistors 83 and 91 due to the saturating current of the amplidynes. This voltage $E_K$ across the resistors 111 and 112 sets the sum of the two amplidyne currents and may be referred to as the pre-saturating voltage.

The regulating effect of the two branches containing the R and I switches with respect to the energization of control field windings 79 and 88 may now be considered. The resistor 119 of the R branch is arranged to have established thereacross a component of voltage variable in accordance with the rectifier load current. This component of voltage may be obtained from the alternating current circuit 1, which is for present considerations the input circuit of the converter, through a current transformer 127, resistors 128 and a suitable rectifier 129. The positive terminal of the rectifier 129 is connected to the lower terminal of resistor 119 and the polarity of the component of voltage thereacross is indicated by the plus and minus signs. The negative terminal of the rectifier 129 is connected through a conductor 130 through control apparatus of the inverter shown in Fig. 2, which will be described later, and returns through a conductor 131 to the upper terminal of resistor 119. A reference component of voltage $E_R$ is established across resistor 120 from an adjustable constant source of voltage which is utilized to establish the load indicated by the load control apparatus. A three-phase induction regulator 132, having its shunt and series windings connected in a manner to provide a voltage of adjustable magnitude, makes a satisfactory reference voltage. The induction regulator, as illustrated, is connected to be energized from the bus 27a through a constant voltage transformer 133. The output circuit of the induction regulator is connected to a suitable rectifier 134 which, in turn, has its direct current output terminals connected to the resistor 120 of the network 110 with the plus and minus signs indicating the polarity of this component of voltage which, it will be observed, is opposite to the component of voltage across resistor 119 corresponding to the rectifier load current.

The induction regulator 132 may be operated in response to several methods of regulating the load of the converter unit, such as manual control, watt control, or demand watt control. The various novel features involved in these several controls for regulator 132 are described and claimed in an application of Gittings and Bateman, Serial No. 560,161, filed October 24, 1944, and assigned to the assignee of the present application. For purposes of illustrating my invention, I have shown a diagrammatic manual control which includes as a suitable driving means for the rotatable element of the device 132 and a reversible motor 134 connected through a suitable shaft and gearing 135 to the rotatable element of the regulator. As a means for controlling the direction and amount of rotation of the motor 134, I have shown a reversing switch 136 connected between the motor 134 and a source of voltage 137 indicated by the + and − signs.

When the tube groups 3 and 4 are operated as inverters, the second branch circuit of network 110 is rendered effective through the I switch 125 with the R switch 121 in the open position. There are again two voltages introduced into the network 110 which affect the field winding 88 of amplidyne 74 and the field winding 79 of amplidyne 73 oppositely. One of these voltages is impressed across resistor 123 and is obtained through conductors 131 and 138 from the rectifier input current of the tube groups 5 and 6, of Fig. 2, which is now assumed to be the rectifier end.

In order to facilitate identification of the various elements and devices of Fig. 2, which are similar in function to those of Fig. 1, the same numerals with a prime mark have been used in Fig. 2 for such corresponding elements, with the exception of the elements of Fig. 2 which have been described heretofore.

With the various elements and devices of Fig. 2 identified as stated, it will be observed that conductors 131 and 138 connect resistor 123 of network 110 to rectifier 129' which, under the conditions now assumed, provides a component of voltage proportional to the rectifier load current. The second component of voltage introduced into the network 110 is for the purpose of correcting the inverter commutating phase angle for voltage variations of the inverter A.-C. output circuit I. The component of voltage for correcting the inverter commutating phase angle for voltage variations on the inverter output circuit is obtained from two resistors 139 and 140. Resistor 139 is connected to be energized from the constant voltage transformer 133 through a suitable rectifier 141, while resistor 140 is connected to be energized in accordance with the voltage of circuit I through a suitable rectifier 142. It will be observed that the resistors 139 and 140 are connected in series relation with the components of voltage of the respective resistors connected in opposed relation. This provides a difference voltage between a constant component of voltage and a component of voltage of the system into which the inverter feeds. A third resistor 143 is connected in series relation with resistors 139 and 140 and is connected to be energized from the bus 27a through a negative phase sequence network indicated by the rectangle 144 and by a suitable rectifier 145 in order to correct for any phase unbalance in the inverter output circuit. The resultant of the three components of voltage obtained from resistors 139, 140 and 143 is impressed across the resistor 124 in the I circuit of the control network 110.

If now the R switch in network 110 is closed, two additional voltages are introduced into the network 110. The one across resistor 119 is proportional to rectifier load current and the one across resistor 120 is proportional to the reference voltage set by the load control regulator 136 and apparatus controlled thereby. These voltages are in opposition, as indicated by the plus and minus signs, and affect the amplidyne 73 and the amplidyne 74 differently, causing one to increase its voltage and the other to decrease its voltage. The component of voltage across resistor 119 is proportional to the rectifier load current and it is assumed is in a direction to cause excitation of the two amplidynes in a direction to retard the grids of the rectifier tube groups 3 and 4. The component of voltage across resistor 120, the reference voltage set by the load regulator, is assumed to operate in a direction to advance the grids of the rectifier. Thus the amplidynes 73 and 74 jointly operate to advance the grids until the component of voltage across 119 (rectifier load current) substantially equals the reference voltage across resistor 120. A further change in load may be effected by again raising the component of voltage across resistor 120.

It should be noted that the return points of the R circuit just described is across resistors 83 and 91 through resistors 83a and 91a and, therefore, across the sum of two voltages determined by the armature currents of the amplidynes 73 and 74. In other words, the two amplidyne currents do not affect the individual currents of control fields 79 and 88 so long as the sum of their currents remains constant as determined by the voltage reference across resistors 111 and 112. On the other hand, the reference voltage across resistor 120 establishes an excitation current in the windings 79 and 88 to obtain the simultaneous increase and decrease of the voltage of the respective amplidynes 73 and 74. If the R switch 121 is opened and the I switch 125 is closed, there are again two principal components of voltage introduced into the network 110 which affect the amplidynes 73 and 74 oppositely. The resultant voltage of the component of voltage across resistor 123, proportional to rectifier load current, and the component of voltage across 124, which is proportional to voltage variations of inverter output circuit and any phase unbalance, is introduced to establish the proper difference in currents in the field windings 79 and 88 so as to affect the amplidynes 73 and 74 oppositely.

The transfer control fields 78 and 87 and 78' and 87', respectively are only energized when the amplidynes with which they are associated are controlling the phase shift network and its associated tube groups for inverter operation. That is, transfer control fields 78 and 87 are only energized when tube groups 3 and 4 are operating as an inverter and tube groups 5 and 6 are operating as a rectifier. Similarly, transfer field windings 78' and 87' are only energized when tube groups 3 and 4 are operating as a rectifier and tube groups 5 and 6 as an inverter. Thus in order to explain the operation of transfer fields 78 and 87, it must be assumed that the tube groups 3 and 4 and the associated control apparatus are functioning for inverter control. Transfer control fields 78 and 87 are connected through conductors 108 and 109 to be responsive to the armature current of the amplidyne 73' of the presently assumed rectifier end and the armature current resistor 83'. A selective switch 146 is connected in the conductor 108 and a rectifier 147 is connected in the circuit 109 so as to render this circuit responsive to current in only one direction. The rectifier 147 is so poled that when the current in the amplidyne armature 73' reverses from its normal direction for rectifier control, as indicated by the voltage drop across resistor 83', the field windings 78 and 87 will be energized so as to cause an advance in the inverter grids and thereby transfer load control to the inverter. The transfer of load control to the inverter can arise when the voltage of the rectifier system is low and the inverter voltage is high. Under such conditions, it may be impossible to transfer full load from the low voltage to the high voltage system with normal commutating angle on the inverter. The amplidyne control of the rectifier will normally effect an advance of the grid angle to obtain the desired load set by the load regulator and if this does not result in the desired load, the voltage and armature current of the rectifier amplidyne 73' will be reversed. This reversal of current across resistor 83' causes current to flow in the transfer field windings 78 and 87 of the inverter so as to cause an advance in the grid angle of the inverter (tube groups 3 and 4), thereby lowering the counter E. M. F. of the inverter and causing an increase in load current.

The excitation of transfer fields 78' and 87' of the amplidyne generators 73' and 74', now assumed to be operating to control tube groups 5 and 6 as inverters, is similarly obtained. The field windings 78' and 87' are connected through conductors 148 and 149 to be responsive to the voltage drop across the resistor 83 of amplidyne 73 now operating for rectifier control. A selective switch 150 is connected in circuit with conductor 148 and a rectifier 151 is connected in conductor 149 and is poled in a direction to cause current flow in field windings 78' and 87' upon reversal of the armature current of amplidyne 73. The operating sequence is the same as that described above with respect to field windings 78 and 87 and no further explanation is believed to be necessary.

Each tube of the several tube groups is furnished with an appropriate excitation circuit. For the ignitor type of tube with a control grid to determine the instant of conduction in each tube both an ignitor energizing circuit 152 and a grid energizing circuit 153 are arranged for each pair of tubes which are to be conductive 180 degrees apart. For the purpose of simplifying the drawing, only one of each of the respective excitation circuits is shown in diagrammatic detail, although it is to be understood that ignitor and grid excitation circuits similar to those illustrated will be connected, as will be understood by those skilled in the art, to the respective pairs of valves and to the proper points on the phase shift network 26 and 26' with due regard to the phase of the anode voltages of the particular pair of tubes to be controlled. A suitable arc initiating circuit for tubes of the ignitor type, as illustrated, may be of the so-called magnetic impulse type such as is described and claimed in an application S. N. 413,232 of A. H. Mittag, filed October 1, 1941, and assigned to the assignee of this application. This type of ignitor circuit is very diagrammatically indicated and comprises, as part of its principal components, a firing capacitor 154 and a firing reactor 155 which is designed to saturate during each half wave of alternating voltage of the circuit 152 by reason of the discharge of current from the firing capacitor 154 through the primary winding 156 of transformer 157. The firing circuit may also include a linear reactor 158 connected between the circuit 152 and the firing capacitor 154 to prevent discharge of the capacitance to the supply circuit 152 and also to limit the current taken from the supply circuit at the time the capacitance 154 discharges. Transformer 157 may be an insulating transformer as illustrated which is provided with a pair of secondary windings 159 and 159a utilized to transform the ignitor peaks up to the high level of the tubes. Hence, one terminal of secondary winding 159 is connected to the ignitor electrode 23 of the upper right hand tube in tube group 4 through a contact rectifier 160, and the other terminal is connected to the cathode 22 of this same tube. The ignitor of the opposed tube of this tube pair would be connected to winding 159a in a similar manner. It is to be understood that the firing peaks of firing reactor 155 occur on both the positive and negative half cycles of the source voltage and thus a single firing reactor 155 provides two peaks displaced 180° apart so as to serve for firing the two opposed tubes.

A suitable grid firing circuit is described and claimed in an application of Burnice D. Bedford, S. N. 539,941 filed concurrently herewith and assigned to the assignee of the present application. However, in this embodiment of my invention I have shown a grid excitation circuit quite diagrammatically but in sufficient detail to incorporate the essential features of this embodiment of my invention. I again illustrate an insulating transformer 161 comprising a primary winding 162 and which is connected to the grid supply circuit 153. The transformer is also provided with a pair of secondary windings 163 and 164. One terminal of secondary winding 164 is connected to the cathode of the upper right hand tube of tube group 4. The secondary winding 164 also supplies a potential to the holding anode circuit 24 through a transformer 165 and a potential to the grid 25 through a transformer 166 which is preferably a peaking transformer. A suitable bias means, indicated by the battery 167, is connected in the grid circuit to hold the tube off or, specifically, to hold the grid negative until the positive peaker voltage overcomes the bias and renders the tube conducting. The secondary winding 163 would be connected to the grid and holding anode circuits of the oppositely disposed tube of this same tube group in a manner understood by those skilled in the art.

In connecting the ignitor circuit 152 and the grid circuit 153 to phase shifter 26, it is necessary to determine the phase of the anode voltage of the particular pair of tubes under consideration and the relation between the several voltages of the respective electrodes of the tube. For the pair of tubes of tube group 4 illustrated, with the ignitor and grid circuits illustrated in diagrammatic detail, it will be assumed that the anode voltage has the phase position indicated by the arrow marked "anode" in the center of phase shift circuit 26. If the firing circuit voltage for the ignitor goes through zero at a given angle displaced from zero anode voltage, which we may assume for purposes of illustration is of the order of 140 degrees advance for the three-phase full wave connection illustrated, the firing reactor would cause the ignitor to fire at a point of the order of 30 degrees after the zero phase of anode voltage. Hence, the ignitor firing circuit 152 would be connected to taps on the polygon windings 37 to 48 of phase shifter 26 such that a line through the taps will be parallel to a line advanced of the order of 140 degrees from the phase of the anode voltage shown. In the drawings, the tap connections indicated for the assumption made are taps 59a and 51a.

If the grid peaker 166 is arranged to fire at the 65° point of the voltage impressed thereon, this means that the grid voltage goes through zero some 35° ahead of the zero phase of the anode voltage and the grid circuit 153 is connected to taps 54a and 51b on the polygon windings 37 to 48 such that a line therethrough is advanced substantially 35° ahead of the assumed phase of the anode voltage. The arrangement and connection of the ignitor circuit 152' and the grid circuits 153' of the tube groups 5 and 6 are made to phase shift network 26' in a similar manner to that described in connection with phase shift network 26.

The general operation of the illustrated embodiment may now be considered briefly. It was considered expedient to describe briefly the operation of the various component parts and elements in connection with the initial consideration of these elements so that the general overall operation may be more easily understood.

In the illustrated embodiment of the invention above described, the system rectifies alternating current from the supply end, such as circuit 1, by the tube groups 3 and 4 to direct current which traverses the direct current loop comprising conductors 3a to 4b to the inverter tube groups 5 and 6 where conversion is effected to alternating current which is supplied to circuit 2, or vice versa.

The direction of power flow is determined by the phase angle of grid excitation. Thus if it is desired to transmit power from circuit 1 to circuit 2, all R switches associated with the apparatus of circuit 1 will be closed while all I switches at this rectifier end will be opened. Conversely, all I switches associated with the apparatus of circuit 2 at the inverter end will be closed and all R switches will be opened. With the amplidyne generators 73 and 74 and 73' and 74' operating at the respective ends of the system, the inductive regulators 132 and 132' will be adjusted to set the reference voltage $E_R$ from the resistors 134 and 134' at such a value as to effect substantial equality between the rectifier voltage and the inverter counter voltage so that no power is interchanged over the direct current loop. With the reference voltage so set, the amplidyne 73 would be caused to operate to fully saturate the odd numbered reactors of the phase shift circuit 26 and the amplidyne 74 would operate to zero current to desaturate the even numbered reactors of phase shift circuit 26 so as to effect full retard on the excitation of the tubes. The amplidynes 73' and 74' would be operated to advance the inverter grids to the minimum desired amount for proper commutation determined by the voltage component across resistors 139' and 140'. Power transfer from circuit 1 to circuit 2 is then increased by adjusting the induction regulator 132 at some predetermined setting corresponding to the desired load. The amplidyne generators 73 and 74 through the action of control field windings 79 and 88, which are oppositely energized from the network 110 in accordance with the difference voltage resulting from the opposed components of voltage across resistor 119 (rectifier load current) and resistor 120 (reference voltage $E_R$), will cause saturation of the even numbered reactors and desaturation of the odd numbered reactors of the phase shift network 26 and thereby cause the rectifier grid voltage to be advanced to increase the load to the desired value. If it be assumed that the particular load setting required full phase advance of the rectifier grids and the desired load was not yet attained, the load transfer mechanism would immediately function due to the reversal of polarity of amplidyne 73 in attempting to effect greater phase advance of the rectifier grids. Upon reversal of amplidyne 73, the polarity of rectifier 151 is such that transfer control fields 78' and 87' of the inverter amplidynes 73' and 74' are energized in such a direction as to cause the inverter grids to be advanced a sufficient amount to permit the greater load to be carried.

Now while the tube groups 3 and 4 were assumed to be operating as rectifiers, it was previously stated that the tube groups 5 and 6 were assumed to be operating as inverters with the I switches closed and the R switches open. Under inverter operation, the ignitor and grid circuits of these tubes are initially adjusted for the proper advanced phase shift for inverter operation. The phase shifter 26', with the I switches closed, has a phase range of the order of 60 degrees. Aside from the feature of load transfer effected through field windings 78' and 87', the inverter tubes through the phase shifter 26' are responsive to two principal components of voltage, namely the component of voltage across resistor 123' which is proportional to the load current of the rectifier at the other end of the system, and a correcting component of voltage across resistor 124' which corrects for voltage variations between the two alternating current systems and for any possible phase unbalance of the inverter as reflected by the negative phase sequence network 144'. By this control, the inverter grids are advanced to maintain an approximately constant margin angle or deionization angle. The tube groups 3 and 4, when operating as an inverter, operate in substantially the same manner as has been described for tube groups 5 and 6. Load transfer control from the tube groups 5 and 6, operating as rectifiers, to tube groups 3 and 4, operating as inverters, is effected through the conductors 108 and 109 to transfer field windings 78 and 87 upon reversal of amplidyne 73' when it has operated to the limit of grid advance for tube groups 5 and 6 operating as rectifiers.

While I have shown and described a particular embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a pair of alternating current circuits, a pair of electronic tube groups having alternating current and direct current terminals, means for interconnecting the alternating current terminals of one of said pair of electronic tube groups with one of said alternating current circuits, means for interconnecting the alternating current terminals of the other of said pair of electronic tube groups with the other alternating current circuit of said pair, means including a loop circuit for connecting the direct current terminals of the respective tube groups in a series circuit arrangement, means for controlling the direct current voltage of one of said tube groups to establish load transfer in one direction between said alternating current circuits, and means for selectively controlling the other of said tube groups to effect load transfer in the same direction.

2. In combination, a pair of alternating current circuits, a pair of electronic tube groups having alternating current and direct current terminals, means for interconnecting the alternating current terminals of one of said pair of electronic tube groups with one of said alternating current circuits, means for interconnecting the alternating current terminals of the other of said pair of electronic tube groups with the other alternating current circuit of said pair, means including a loop circuit for connecting the direct current terminals of the respective tube groups in a series circuit arrangement, means for increasing the direct current voltage of one of said tube groups to effect an increase in load transfer in one direction between said alternating current circuits, and means for selectively decreasing the direct current voltage of the other of said tube groups to effect a further increase in said load transfer in the same direction.

3. In combination, a pair of alternating current circuits, a pair of electronic tube groups having alternating current and direct current terminals, means for interconnecting the alternating current terminals of one of said pair of electronic tube groups with one of said alternating current circuits, means for interconnecting the alternating current terminals of the other of said pair of electronic tube groups with the other alternating current circuit of said pair, means including a loop circuit for connecting the direct current terminals of the respective tube groups in a series circuit arrangement, means for controlling one of said tube groups for effecting a predetermined power transfer in one direction between said alternating current circuits, means for controlling the other of said tube groups for controlling power transfer between said alternating current circuits, and means responsive to an operating condition of said first mentioned means for transferring the control of power transfer between said circuits to said second mentioned means.

4. In combination, a pair of alternating current circuits, a pair of electronic tube groups each comprising a plurality of electric discharge devices of the type employing an ionizable medium and each device having an anode, a cathode and a control electrode, means for interconnecting one of said tube groups with one of said alternating current circuits, means for interconnecting the other of said tube groups with the other of said alternating current circuits, a loop circuit for interconnecting said tube groups, arc initiating circuits arranged with each one of said tube groups, excitation circuits arranged one with each of said tube groups, a source of voltage correlated in phase and frequency with said one of said alternating current circuits, a phase shift network interposed between said source of voltage and the arc initiating and excitatiton circuits of said one group of tubes, a source of voltage correlated in phase and frequency with said other of said alternating current circuits, a phase shift network interposed between said second mentioned source of voltage and the arc initiating and excitation circuits of said other group of tubes, means for controlling said first mentioned phase shift circuit to shift the phase of the voltage applied to the arc initiating circuits and said excitation circuits of said one group of tubes from a retarded phase relative to the voltage of the associated anodes to an in-phase relation and vice versa, means for controlling said second mentioned phase shift circuit to shift the phase of the voltage applied to said arc initiating and said excitation circuits of said other group of tubes from one phase advanced position relative to the associated anodes to a greater phase advanced position and vice versa, and means for interchanging the phase shift changes of the respective phase shift networks.

5. In combination, a pair of alternating current circuits, a pair of electronic tube groups each comprising a plurality of electric discharge devices of the type employing an ionizable medium and each device having an anode, a cathode and a control electrode, means for interconnecting one of said tube groups with one of said alternating current circuits, means for interconnecting the other of said tube groups with the other of said alternating current circuits, a loop circuit for interconnecting said tube groups, arc initiating circuits arranged with each one of said tube groups, excitation circuits arranged one with each of said tube groups, a source of voltage correlated in phase and frequency with said one of said alternating current circuits, a phase shift network interposed between said source of voltage and the arc initiating and excitation circuits of said one group of tubes, a source of voltage correlated in phase and frequency with said other of said alternating current circuits, a phase shift network interposed between said second mentioned source of voltage and the arc initiating and excitation circuits of said other group of tubes, means for controlling said first mentioned phase shift circuit to shift the phase of the voltage applied to the arc initiating circuits and said excitation circuits of said one group of tubes from a retarded phase of 90 degrees relative to the voltage of the associated anodes to an in-phase relation and vice versa, means for controlling said second mentioned phase shift circuit to shift the phase of the voltage applied to said arc initiating and said excitation circuits of said other group of tubes from a phase advanced position of the order of 20 degrees relative to the associated anodes to a phase advanced position of the order of 60 degrees and vice versa, and means for interchanging the phase shift changes of the phase shift networks.

6. In an electronic power conversion system, an alternating current circuit, a group of electronic tubes each having an anode, a cathode and a control electrode, transforming means for connecting said group of electronic tubes to said alternating circuit for changing alternating current to direct current or vice versa, excitation circuits connected to the control electrode of each of said tubes, a phase shift network having a plurality of taps for providing a plurality of components of voltage displaced in phase, means for connecting the respective excitation circuits to taps of displaced phase in said phase shift network in accordance with the phase of the associated anode voltage of each control electrode, a source of alternating current voltage correlated in phase and frequency with said alternating current circuit and being provided with a plurality of phase terminals, means for connecting each of said phase conductors to two pairs of points of different phase displacement in said phase shift network, and means for selectively connecting each phase conductor to one or the other pair of points of two predetermined pairs of said points.

7. In an electronic power conversion system, an alternating current circuit, a direct current circuit, a group of electronic tubes each having an anode, a cathode and a control electrode, means for interconnecting said alternating current and direct current circuits with said group of tubes for operation either as a rectifier or as an inverter, an excitation circuit for the control electrodes of each of said tubes, a source of excitation correlated in phase and frequency with said alternating current circuit, phase shifting means interconnecting said source and the excitation circuits of the respective tubes, means responsive to an electric condition of said alternating current circuit during operation of said tube group as a rectifier for controlling said phase shifting means to shift the phase of an output voltage connected to said excitation circuit over a range necessary to determine the amount of power transferred between said alternating current circuit and said direct current circuit when said tube group is operating as a rectifier, means for advancing the phase of said output voltage relative to said rectifier range for causing operation of said tube group as an inverter, and means responsive to an electrical condition of said alternating current circuit for controlling said phase shifting means over a predetermined range when said tube group is operated as an inverter.

8. In an electric power conversion system, a pair of circuits one of which is an alternating current circuit, electric translating apparatus connected between said circuits and comprising an electric discharge device of the type employing an ionizable medium and including an anode, a cathode and a control electrode for determining the instant of conduction through said discharge device, a phase shift network having a plurality of taps for providing a plurality of components of voltage displaced in phase, means for connecting said control electrode to taps in said phase shift network, a source of alternating current correlated in phase and frequency with said alternating current circuit and being provided with a plurality of phase terminals, means for connecting each of said phase conductors to a pair of points of different phase displacement in said phase shift network, and means for modifying said last mentioned means to shift the effective point of entry of each of said phase conductors to said phase shift network from one point of said pair of points to the other point and vice versa.

9. In an electronic power conversion system, a pair of circuits one of which is an alternating current circuit, electric translating apparatus connected between said circuits and comprising an electric discharge device of the type employing an ionizable medium and including an anode, a cathode and a control electrode for determining the instant of conduction through said discharge device, a phase shift network having a plurality of taps for providing a plurality of components of voltage displaced in phase, means for connecting said control electrode to taps in said phase shift network, a source of alternating current correlated in phase and frequency with said alternating current circuit and being provided with a plurality of phase terminals, means comprising a plurality of reactors each having a pair of windings with an intermediate junction point connected one to each phase conductor and each having end terminals connected to pairs of spaced points in said network, a plurality of control windings arranged one with each winding of said reactors, and means including a source of variable direct current for reversely changing the saturation of each pair of reactors to shift the effective point of entry of each of said phase conductors to said phase shift network.

10. In an electronic power conversion system, a pair of circuits one of which is a polyphase alternating current circuit, electric translating apparatus connected between said circuits and comprising a group of electric tubes each having an anode, a cathode and a control electrode for determining the instant of conduction through the respective tubes, a polyphase phase shift network having a plurality of taps for providing a plurality of components of voltage displaced in phase for said control electrodes, means for connecting the control electrodes of each of said tubes to taps of displaced phase in said network, a source of alternating current correlated in phase and frequency with said alternating current circuit and being provided with a plurality of phase terminals, means comprising a plurality of reactors each having a pair of windings with an intermediate junction point and a pair of end terminals the junction point of each reactor being connected to a different one of said phase conductors and the end terminals of each reactor being connected to different pairs of spaced points in said network, a plurality of control windings arranged one with each winding of said reactors, a pair of direct current generators, one of said generators being connected to energize one group of control windings associated with corresponding windings of each reactor between the intermediate junction and one end terminal, the other of said generators being connected to energize the other group of control windings associated with corresponding windings of each reactor between the intermediate junction and the other end terminal, and means for controlling said generators to effect a simultaneous inverse change in the voltage of said generators.

11. In an electronic power conversion system, a pair of circuits one of which is a polyphase alternating current circuit, electric translating apparatus connected between said circuits and comprising a group of electric tubes each having an anode, a cathode and a control electrode for determining the instant of conduction through the respective tubes, a polyphase phase shift network having a plurality of taps for providing a plurality of components of voltage displaced in phase for said control electrodes, means for connecting the control electrodes of each of said tubes to taps of displaced phase in said network, a source of alternating current correlated in phase and frequency with said alternating current circuit and being provided with a plurality of phase terminals, means comprising a plurality of reactors each having a pair of windings with an intermediate junction point and a pair of end terminals the junction point of each reactor being connected to a different one of said phase conductors and the end terminals of each reactor being connected to different pairs of spaced points in said network, a plurality of control windings arranged one with each winding of said reactors, a pair of direct current generators each having a control field winding, one of said generators being connected to energize one half of the control windings associated with corresponding windings of each of said reactors and the other of said generators being connected to energize the other half of said control windings, a control network for energizing the field windings of said generators, means for energizing said control network to maintain the sum of the currents in said field winding constant, and means for energizing said control network for reversely changing the energization of said field windings in a manner to inversely change the saturation of the respective reactors of each pair of reactors.

12. In an electronic power conversion system, an alternating current circuit, a direct current circuit, rectifying apparatus interconnecting said circuits and comprising a plurality of electronic tubes each having an anode, a cathode and a control electrode for determining the instant of conduction of each tube, a phase shift circuit comprising a ring winding having a plurality of displaced taps on said winding for providing a multi-phase output circuit, means for connecting the respective control electrodes to different pairs of output taps, a source of alternating voltage correlated in phase and frequency with said alternating current circuit and comprising fewer phase conductors than the number of output circuits of said phase shift network, means including a midtapped saturable reactor for connecting each phase conductor to different pairs of displaced points on said ring winding with an equal spacing between the respective pairs of points, a control winding for each winding of said midtapped reactor, a direct current generator for energizing the control windings associated with the reactor windings to one side of the midtap, a second direct current generator for energizing the control windings associated with the reactor windings to the other side of the midtap, a resistance control network having an output circuit for controlling the output voltage of said generators, means interconnecting said control network and said dynamo-electric machines for maintaining the sums of the armature currents constant, means for energizing said network to provide therein a constant reference voltage, means for energizing said network to provide therein a component of voltage variable with the current of said alternating current, and means for deriving a differential component of voltage from said network for changing the voltage of said generators inversely to change the energization of said control winding inversely and thereby advance the phase of said control electrode circuits so long as said different component of voltage exists.

13. In an electronic power conversion system, an alternating current circuit, a direct current circuit, a group of electronic tubes each having an anode, a cathode and a control electrode for interconnecting said circuits and for changing alternating current to direct current or vice versa, excitation circuits connected to the respective control electrodes of each tube, a phase shift network, means for connecting each of said excitation circuits to said phase shift network, a source of alternating current correlated in phase and frequency with said alternating current circuit, means comprising a plurality of saturable reactors arranged one for each phase conductor for selectively connecting each phase conductor to one pair of points in said network for rectifier operation of said tube groups and to another pair of points in said network for inverter operation of said tube groups, direct current saturating control windings for each saturable reactor, means responsive to an electrical condition of said alternating current circuit for varying the saturating current of said control windings in a manner to shift the phase of the output circuits of said phase shift network through substantially ninety electrical degrees when said electronic tube group is operating as a rectifier, and means jointly responsive to the total current of said control windings and the voltage of said alternating current circuit for varying the saturating current of said control windings in a manner to advance the phase of the output circuits from a predetermined advanced phase position to a greater advance position when said tube group is operating as an inverter.

14. An electric tube converting system comprising a first alternating current circuit, a direct current circuit, means for transmitting energy therebetween including a group of electronic tubes each provided with a control electrode, a second alternating current circuit, means for transmitting energy between said direct current circuit and said second alternating current circuit including a second group of tubes each provided with a control electrode, means associated with each tube group for impressing upon the control electrodes of each tube group an alternating current voltage correlated in phase and frequency with its associated alternating current circuit, and means interconnecting said last mentioned means for simultaneously varying the phase of said alternating voltages in the same sense.

15. An electric tube converting system comprising a first alternating current circuit, a direct current circuit, a rectifier interconnecting said circuits and including a group of electronic tubes each provided with a control electrode, a second alternating current circuit, an inverter interconnecting said second alternating current circuit and including a second group of electronic tubes each provided with a control electrode, a phase shifting network having a plurality of output circuits for exciting the control electrodes of each group of tubes from its associated alternating current circuit, and means for simultaneously varying the phase of the voltages of said output circuits of the respective phase shifting networks in the same sense.

16. An electric tube converting system comprising a first alternating current circuit, a direct current circuit, a rectifier interconnecting said circuits and including a group of electronic tubes each provided with a control electrode, a second alternating current circuit, an inverter interconnecting said second alternating current circuit and including a second group of electronic tubes each provided with a control electrode, a phase shifting network having a plurality of output circuits for exciting the control electrodes of each group of tubes from its associated alternating current circuit, means for controlling the phase shift network associated with said rectifier tube group to effect a phase shift in the control electrodes of said rectifier tube groups from a retarded position to a fully advanced position, and means responsive to the fully advanced condition effected by said last mentioned means for thereafter controlling the phase shift network associated with said inverter tube group to effect a phase advance of the control electrodes of the tubes of said inverter tube group.

17. An electric tube converting system comprising a first alternating current circuit, a direct current circuit, a rectifier interconnecting said circuits and including a group of electronic tubes each provided with a control electrode, a second alternating current circuit, an inverter interconnecting said second alternating current circuit and including a second group of electronic tubes each provided with a control electrode, a phase shifting network for each tube group and each having a plurality of output circuits for exciting the control electrodes of each group of tubes from its associated alternating current circuit, a first group of saturable reactors connected to the phase shifting network associated with said rectifier tube group, a second group of saturable reactors connected to the phase shifting network associated with said inverter tube group, a first group of direct current control windings for said first group of saturable reactors, a second group of direct current control windings for said second group of saturable reactors, a first pair of direct current generators each having a plurality of field windings, one pair of field windings of the respective generators being connected in buck and boost connection so that the armature currents of the respective generators will vary inversely, one of said generators being connected to certain of said first group of control windings and the other of said generators being connected to the other control windings of said first group, a second pair of direct current generators each having a plurality of field windings, a pair of field windings of said second pair of generators being connected in buck and boost connection so that the armature currents of the respective generators will vary inversely, one of said generators of said second pair being connected to certain of said second group of control windings and the other of said generators of said second pair being connected to the other control windings of said second group, means responsive to the load current of said system for controlling said one pair of field windings of said first group of generators in a manner to change the excitation of the control windings of the phase shift circuit associated with said rectifier to effect a phase shift of the rectifier control electrodes from a retarded phase condition relative to the associated anodes to an in-phase condition and vice versa, and means responsive to a function of the voltage of the alternating current circuit connected to said inverter group of tubes for controlling said one pair of field windings of said second group of generators in a manner to change the excitation of the control windings of the phase shift circuit associated with said inverter to effect a phase shift of the inverter control electrodes from a predetermined advanced phase condition relative to the associated anodes to a greater predetermined advanced phase condition and vice versa.

18. In combination, a first electric circuit comprising a plurality of phase conductors, a second electric circuit comprising a plurality of phase conductors, means associated with one of said circuits for providing two terminals having a difference of potential therebetween, means comprising at least two impedances connected between said terminals, means including a pair of inversely variable sources of voltage connected with said two impedances for effecting an inverse change in said impedances for producing therefrom a voltage variable in magnitude, and means for introducing said variable voltage between the phase conductors of said first circuit and the phase conductors of said second circuit for producing a change in the phase relation between the voltages of said first and second circuits.

19. In combination, a first electric circuit comprising a plurality of phase conductors, a second electric circuit comprising a plurality of phase conductors, means associated with one of said circuits for providing two terminals having a difference of potential therebetween, means comprising two impedances connected between said terminals and each impedance being provided with a direct current saturating winding, a source of voltage connected to the saturating winding of one of said impedances, a second source of voltage connected to the saturating winding of the other of said impedances, means for inversely changing the voltages of said sources for inversely changing the value of said impedances, and means for introducing said impedances between the phase conductors of said first and second circuits for producing a change in the phase relation between the voltages of said first and second circuits.

20. In combination, a first alternating current circuit comprising a plurality of phase conductors, a second alternating current circuit comprising a plurality of phase conductors, an inductive network for interconnecting said circuits and being provided with a plurality of connection terminals, the phase conductors of one of said circuits being connected directly to spaced terminals of said network, a plurality of pairs of series connected inductive devices with the pairs equal in number to the phase conductors of said other circuit and each pair of inductive devices having an intermediate junction terminal and two end terminals, the end terminals of each pair being connected to spaced terminals on said network, each phase conductor of said other circuit being connected to a different junction point of said pairs of inductive devices, a plurality of direct current saturating windings arranged one with each of said inductive devices, a first dynamo-electric machine connected to the saturating windings of said inductive devices on one side of the junction terminal thereof, a second dynamo-electric machine connected to the saturating windings of inductive devices on the other side of the junction point thereof, means for inversely changing the voltage of each of said dynamo-electric machines for shifting the effective point of entry of each phase conductor associated with each pair of inductive devices from one spaced terminal of each pair of terminals of said network to the other spaced terminal of the pair.

21. In combination, a first alternating current circuit comprising a plurality of phase conductors, a second alternating current circuit comprising a plurality of phase conductors, an inductive network for interconnecting said circuits and being provided with a plurality of connection terminals, the phase conductors of one of said circuits being connected directly to spaced terminals of said network, a plurality of pairs of series connected inductive devices with the pairs equal in number to the phase conductors of said other circuit and each pair of inductive devices having an intermediate junction terminal and two end terminals, the end terminals of each pair being connected to spaced terminals on said network, each phase conductor of said other circuit being connected to a different junction point of said pairs of inductive devices, a plurality of direct current saturating windings arranged one with each of said inductive devices, a first dynamo-electric machine provided with a control field winding and having an armature circuit connected in series relation with the saturating windings of said inductive devices on one side of the junction terminal of each pair, a second dynamo-electric machine being provided with a control field winding and having an armature circuit connected in series relation with the saturating windings of said inductive devices on the other side of the junction terminal of each pair, and means including said control field windings for maintaining the sum of the armature currents of said dynamo-electric machines substantially constant and for effecting an inverse change in the respective armature currents in a manner to shift the phase relation between the voltages of said alternating current circuits.

22. In combination, a polyphase supply circuit comprising a plurality of phase conductors, a plurality of output circuits comprising phase conductors, an inductive coupling for interconnecting said supply circuit and said plurality of output circuits and comprising a plurality of windings connected to form a polygon, a plurality of other inductive windings inductively related to and interconnecting certain of said first mentioned windings for substantially fixing the voltages of said polygon in rigid polyphase relation, a plurality of pairs of variable impedance devices having end terminals and an intermediate junction terminal for each pair, said junction terminals being connected to different phase conductors of one of said circuits, means for connecting the end terminals of each pair of impedance devices to different pairs of spaced points on said polygon of windings, means for connecting the phase conductors of the other of said circuits to said polygon of windings, and means for varying the respective impedances of each pair of impedances for shifting the phase relation between the voltages of said supply circuit and said output circuits.

23. In combination, a polyphase supply circuit comprising a plurality of phase conductors, a plurality of output circuits, an inductive coupling for interconnecting said supply circuit and said plurality of output circuits and comprising a plurality of windings connected to form a polygon, a plurality of other inductive windings inductively related to and interconnecting certain of said first mentioned windings for substantially fixing the voltages of said polygon in rigid polyphase relation, a plurality of pairs of variable impedance devices having end terminals and an intermediate junction terminal for each pair and arranged one pair of impedance devices for each phase conductor of said supply circuit, means for connecting each phase conductor of said supply circuit to a different junction terminal of the respective pairs of impedance devices, means for connecting the end terminals of each pair of impedance devices to different pairs of spaced points on said polygon of windings, and means for inversely varying the respective impedances of each pair of impedances for shifting the phase relation between the voltages of said supply circuit and said output circuits.

24. In combination, a polyphase supply circuit comprising a plurality of phase conductors, a plurality of output circuits, an inductive coupling for interconnecting said supply circuit and said plurality of output circuits and comprising a plurality of windings connected to form a polygon, a plurality of other inductive windings inductively related to and interconnecting certain of said first mentioned windings for substantially fixing the voltages of said polygon in rigid polyphase relation, a plurality of pairs of impedance windings in which each pair is provided with end terminals and an intermediate junction terminal and arranged one pair of impedance windings for each phase conductor of said supply circuit, a plurality of direct current control windings arranged one with each of said impedance windings, a first group of a plurality of pairs of terminals spaced a predetermined number of electrical degrees on said polygon of windings in which each pair of terminals is spaced the same number of electrical degrees, a second group of a plurality of pairs of spaced terminals on said polygon of windings in which each pair of terminals is spaced the same number of electrical degrees relative to each other and differing from the spacing of each pair of terminals of said first group of terminals, means for connecting each phase conductor of said supply circuit to a different junction terminal of said pairs of impedance windings, means for selectively connecting the end terminals of each pair of impedance windings to different pairs of spaced terminals of said first group of spaced terminals or to different pairs of spaced terminals of said second group of spaced terminals, a source of variable direct current connected to energize said direct current control windings, and means for inversely changing the direct current traversing certain of said control windings with respect to the direct current traversing the remainder of said control windings in a manner to shift the voltages between said supply circuit and said output circuits within limits corresponding to the electrical degrees displacement between the terminals on said polygon of windings to which the phase conductors of said supply circuit are connected.

25. In combination, a three phase supply circuit comprising three phase conductors, a polyphase output circuit comprising a plurality of phase conductors equal in number to a multiple of the number of supply circuit conductors for providing a plurality of circuits having voltage components respectively displaced in phase a predetermined and fixed number of electrical degrees, an inductive coupling for interconnecting said supply circuit and said output circuit and comprising a plurality of inductive windings equal in number to the number of phases of said polyphase output circuit and connected to form a polygon having a plurality of connection points, a plurality of other inductive windings equal in number to one-half of said plurality of inductive windings inductively related to and interconnecting different vertices of said polygon of windings for substantially fixing the voltages of said polygon in rigid polyphase relation, means including saturable inductive windings for connecting each phase conductor to different pairs of connection points on said polygon of windings with the respective points of each pair displaced a predetermined number of electrical degrees, means including a control winding for each of said saturable inductive windings for varying the saturation thereof and shifting the effective connection of each phase conductor to said polygon from one point of connection to the other, or vice versa, in a manner to shift the phase relation between the voltage of said supply circuit and the voltages of said output circuit an amount equal to the number of electrical degrees between a pair of points on said polygon of windings.

26. In an electronic power conversion system, a pair of circuits one of which is an alternating current circuit, electric translating apparatus connected between said circuits for operation either as a rectifier or an inverter and comprising a plurality of electric discharge devices, each discharge device including an anode, a cathode and a control electrode for determining the instant of conduction between each anode and cathode, a phase shifting network connected to be energized from said alternating current circuit and being provided with a plurality of excitation output circuits connected to said control electrode circuits, means including a dynamo-electric machine having a control winding for controlling said phase shift network to effect a change in the phase relation of each control electrode with respect to its associated anode, means responsive to the input current of said translating apparatus when operated as a rectifier for controlling said field winding to effect a phase shift between the voltage of the output circuit of said network relative to the input voltage thereof from a predetermined retarded phase relation to a less retarded phase relation and vice versa, means responsive to the current of said dynamo-electric machine when said translating apparatus is connected as an inverter for controlling said field winding to effect a phase shift between the voltage of said output circuit relative to the input voltage thereof from a predetermined leading phase relation to a greater leading phase relation and vice versa, and means for selectively determining the control of said dynamo-electric machine for rectifier or inverter operation.

27. In an electronic power conversion system, a first alternating current circuit, a second alternating current circuit, a first electronic converter for operation as a rectifier or inverter connected to said first alternating current circuit and comprising a plurality of electronic tubes each having an anode, a cathode and a control electrode, a second electronic converter for operation as a rectifier or inverter connected to said second alternating current circuit and comprising a plurality of electronic tubes each having an anode, a cathode and a control electrode, a direct current circuit interconnecting the direct current terminals of said converters, a first phase shift network connected to be energized from said first alternating current circuit and being provided with output circuits connected to energize the control electrode circuits of said first converter, means including a first dynamo-electric machine having two control windings for controlling the phase relation between the input and output circuits of said phase shift network, means responsive to the current input to said first converter when operating as a rectifier for controlling one of said control windings to shift the phase relation of the output circuit of said phase shift network from a retarded phase to an in-phase relation or vice versa, a second phase shift network connected to be energized from said second alternating current circuit and being provided with output circuits connected to energize the control electrode circuits of said second converter, means including a second dynamo-electric machine having two control windings for controlling the phase relation between the input and output circuits of said second phase shift network, means responsive to the current input to said second converter when operating as a rectifier for controlling one of the control windings of said second dynamo-electric machine to shift the phase relation of the output circuit of said second phase shift network from a retarded phase to an in-phase relation or vice versa, means including a unidirectional conducting circuit responsive to the current of said first dynamo-electric machine above a predetermined value when controlling said first converter as a rectifier for energizing the other control winding of said second dynamo-electric machine to effect a further advance in the phase relation of the output voltages of said second phase shift circuit of said second converter when operating as an inverter, and means including a unidirectional conducting circuit responsive to the current of said second dynamo-electric machine above a predetermined value when controlling said second converter as a rectifier for energizing the other control winding of said first dynamo-electric machine to effect a further advance in the phase relation of the output voltages of said first phase shift of said first converter when operating as an inverter.

28. In combination, a dynamo-electric machine having an armature circuit, an anti-hunting field winding connected to be responsive to a transient electrical condition of said armature circuit and arranged to oppose a change of said transient condition in either direction, impedance means connected in circuit with said field winding, and means for causing said impedance means to have a different impedance for a change of said transient condition in one direction than in the opposite direction.

29. In combination, a dynamo-electric machine having an armature winding, an anti-hunting field winding connected to be responsive to the voltage of said armature winding and arranged to oppose a change in armature voltage in either direction, a pair of resistors connected in parallel relation relative to the current of said field winding and in series relation with said field winding, and a unidirectional conducting device connected in series relation in the parallel path of one of said resistors.

30. In combination, a dynamo-electric machine having an armature winding, an anti-hunting field winding connected to be responsive to the voltage of said armature winding and arranged to oppose a change in armature voltage in either direction, a pair of resistors connected in parallel relation relative to the current of said field winding and in series relation therewith, a unidirectional conducting device connected in series relation in the parallel path of one of said resistors, and a capacitor connected in series relation with said field winding.

31. In combination, a reversible voltage dynamo-electric machine having an armature winding, an anti-hunting field winding connected to be responsive to a transient electrical condition of said armature winding and arranged to oppose a change of said transient condition in either direction for either polarity of voltage of said armature winding, a three-branch parallel circuit including a resistor in each branch and connected in series relation with said field winding, a unidirectional conducting device connected in each of two of the branches of said three-branch parallel circuit, the respective unidirectional conducting devices being oppositely poled, and means for selectively interrupting one or the other of said resistor branches which includes one of said unidirectional conducting devices in accordance with the polarity of the voltage of said armature winding.

CLODIUS H. WILLIS.

REFERENCES CITED

The following references are of record in the file of this patent:

UNITED STATES PATENTS

| Number | Name | Date |
|---|---|---|
| 2,013,454 | Willis | Sept. 3, 1935 |
| 2,214,610 | Freudenhammer | Sept. 10, 1940 |